(12) United States Patent
Heo et al.

(10) Patent No.: US 7,719,654 B2
(45) Date of Patent: May 18, 2010

(54) LIQUID CRYSTAL DISPLAY

(75) Inventors: Jeong-Uk Heo, Seongnam-si (KR);
Byoung-Joo Kim, Anyang-si (KR);
Chul Huh, Yongin-si (KR)

(73) Assignee: Samsung Electronics Co., Ltd.,
Suwon-Si, Gyeonggi-Do (KR)

( * ) Notice: Subject to any disclaimer, the term of this patent is extended or adjusted under 35 U.S.C. 154(b) by 378 days.

(21) Appl. No.: 11/481,758

(22) Filed: Jul. 6, 2006

(65) Prior Publication Data
US 2007/0019151 A1 Jan. 25, 2007

(30) Foreign Application Priority Data
Jul. 22, 2005 (KR) .................. 10-2005-0066816

(51) Int. Cl.
*G02F 1/1339* (2006.01)
(52) U.S. Cl. .................. 349/155; 349/156; 349/157
(58) Field of Classification Search .......... 349/155–157
See application file for complete search history.

(56) References Cited

U.S. PATENT DOCUMENTS

| | | | |
|---|---|---|---|
| 6,317,187 B1 * | 11/2001 | Nakajima et al. | 349/155 |
| 6,339,462 B1 * | 1/2002 | Kishimoto et al. | 349/156 |
| 6,577,374 B1 | 6/2003 | Nakata et al. | |
| 7,304,712 B2 * | 12/2007 | Sawasaki et al. | 349/156 |
| 2004/0012751 A1 * | 1/2004 | Iizuka et al. | 349/156 |
| 2005/0185129 A1 * | 8/2005 | Kim et al. | 349/156 |
| 2005/0243263 A1 * | 11/2005 | Yoon | 349/156 |
| 2007/0052910 A1 * | 3/2007 | Li et al. | 349/155 |

FOREIGN PATENT DOCUMENTS

| | | |
|---|---|---|
| JP | 2000147234 | 5/2000 |
| JP | 2002023150 | 1/2002 |
| JP | 2002090748 | 3/2002 |
| JP | 2002090751 | 3/2002 |
| JP | 2003156751 | 5/2003 |
| JP | 2005003854 | 1/2005 |
| KR | 20030085734 | 11/2003 |
| KR | 20040029561 | 4/2004 |
| KR | 20040062083 | 7/2004 |
| KR | 20040066241 | 7/2004 |
| KR | 20050005637 | 1/2005 |

OTHER PUBLICATIONS

English Abstract for Publication No. 2000-147234.
English Abstract for Publication No. 2002-023150.
English Abstract for Publication No. 2002-090748.
English Abstract for Publication No. 2002-090751.
English Abstract for Publication No. 2003-256751.
English Abstract for Publication No. 1020030085734.
English Abstract for Publication No. 10-2004-0029561.
English Abstract for Publication No. 1020040062083.
English Abstract for Publication No. 1020040066241.
English Abstract for Publication No. 2005-003854.
English Abstract for Publication No. 1020050005637.

* cited by examiner

*Primary Examiner*—Hemang Sanghavi
(74) *Attorney, Agent, or Firm*—F. Chau & Associates, LLC (57) ABSTRACT

A liquid crystal display is provided, which includes a first panel and a second panel facing each other, a liquid crystal layer formed between the first and second panels, and a plurality of column spacers each having a pillar and a base supporting the pillar. The width of the pillar is less than that of the base portion.

16 Claims, 12 Drawing Sheets

FIG.10

LIQUID CRYSTAL DISPLAY

CROSS-REFERENCE TO RELATED APPLICATION

This application claims priority under 35 U.S.C. § 119 from Korean Patent Application No. 10-2005-0066816, filed on Jul. 22, 2005, the contents of which are incorporated herein by reference in their entirety.

BACKGROUND OF THE INVENTION

1. Technical Field

The present invention relates to a liquid crystal display, and more particularly, to a liquid crystal display that can endure external pressure without a reduction of elasticity intensity.

2. Discussion of the Related Art

A liquid crystal display (LCD) is one of the most widely used flat panel displays. An LCD includes two panels provided with field-generating electrodes, such as pixel electrodes and a common electrode, and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

In the LCDs, a plurality of active spacers is used to maintain a uniform cell gap between an upper panel and a lower panel, where bead spacers or column spacers may be used as the active spacers.

When using bead spacers, the manufacturing process may be simplified and easy. However, because the beads spacers are floating, they are moved with the liquid crystal material during the injection of the liquid crystal material. Therefore, when the movement pressure and the movement distance are large, the panel may be curved such that light leakage occurs. Because the column spacers are formed by a photolithography process, differently from the bead spacers, the column spacers are formed in predetermined positions. However, because the column spacers have a low elasticity intensity and do not endure a large load compared with the bead spacers, the column spacers or underlayers may collapse when the liquid crystal display experiences external pressure, causing spots to occur.

The density and scale of the column spacers, or the endurance quality of the column spacers, can be improved to endure increased pressure or load. However, if the density and scale of the column spacers are improved, the elasticity intensity may be reduced.

SUMMARY OF THE INVENTION

In an embodiment of the present invention a liquid crystal display is provided, which includes a first panel and a second panel facing each other, a liquid crystal layer formed between the first and the second panels, and a plurality of column spacers having a pillar and a base supporting the pillar, wherein the width of the pillar is less than that of the base portion.

The base may have a plurality of branches extended to the center with a radial shape.

The branches may be extended in upper and lower directions with a line shape.

The branches may be extended to upper, lower, left, and right directions with a cross shape.

The plane of the base may have symmetry with respect to a vertical or a horizontal line.

The pillar and the base may be made of a single body.

The height of the base may be in the range of about 50 to about 80 percent of that of the column spacers.

The first panel may include a plurality of gate lines and data lines intersecting each other, a plurality of thin film transistors connected to the gate lines and the data lines, and a plurality of pixel electrodes connected to the thin film transistors.

The second panel may include a plurality of color filters, and a common electrode formed on the color filters.

In an embodiment of the present invention a column spacer for a liquid crystal display panel is provided, including a pillar and a base supporting the pillar, wherein the width of the pillar is less than that of the base portion, the base includes a plurality of branches that are centrally extended with a radial shape and the branches are extended in upper and lower directions with a line shape or the branches are extended to upper, lower, left, and right directions with a cross shape.

BRIEF DESCRIPTION OF THE DRAWINGS

Exemplary embodiments of the present invention can be understood in more detail from the following descriptions taken in conjunction with the accompanying drawings in which.

DETAILED DESCRIPTION OF EXEMPLARY EMBODIMENTS

Exemplary embodiments of the present invention now will be described more fully hereinafter with reference to the accompanying drawings, in which exemplary embodiments of the invention are shown. The present invention may, however, be embodied in many different forms and should not be construed as limited to the embodiments set forth herein.

An LCD according to an embodiment of the present invention will be described in detail with reference to FIGS. 1-4.

Figure 1:
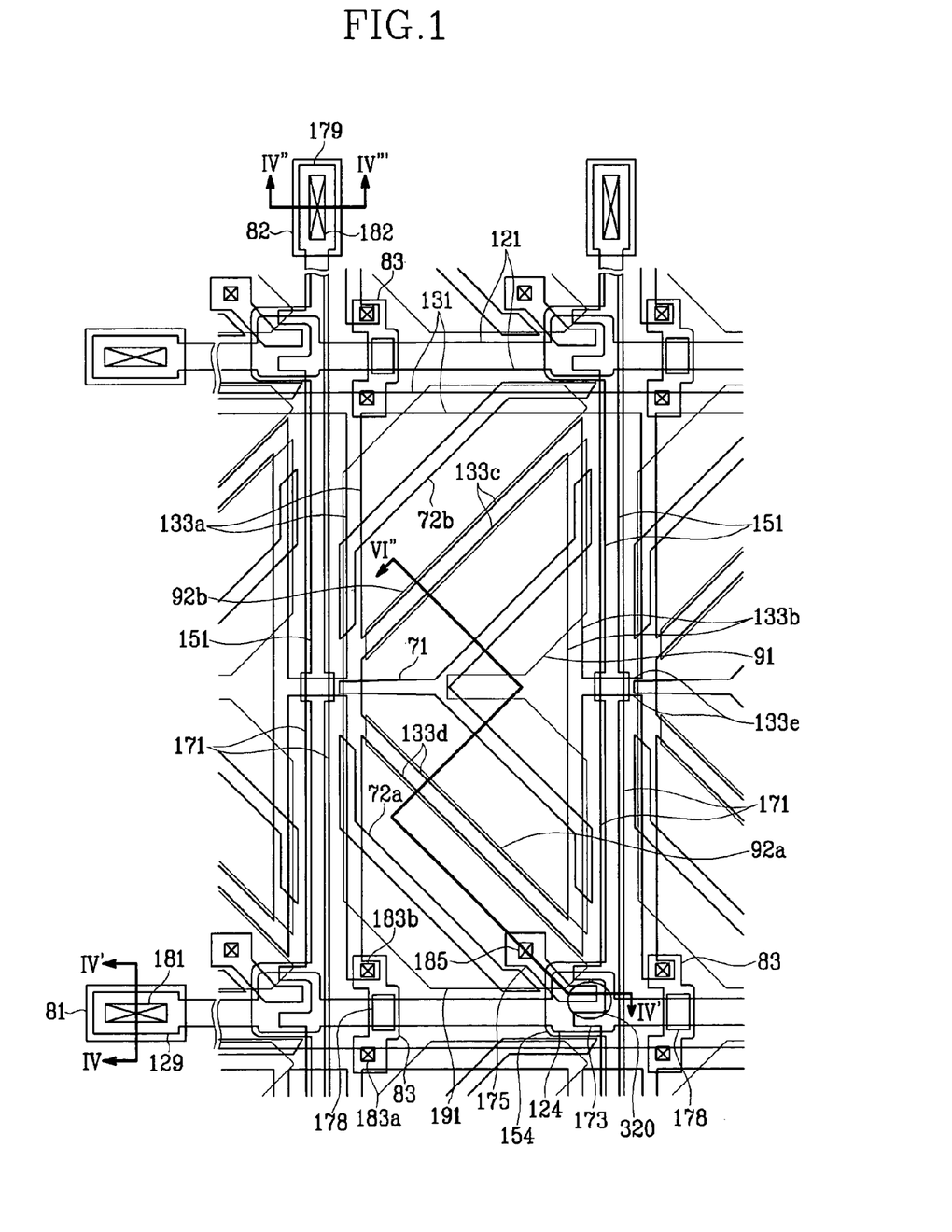
FIG. 1 shows a layout view of an LCD according to an embodiment of the present invention.
Figure 2:
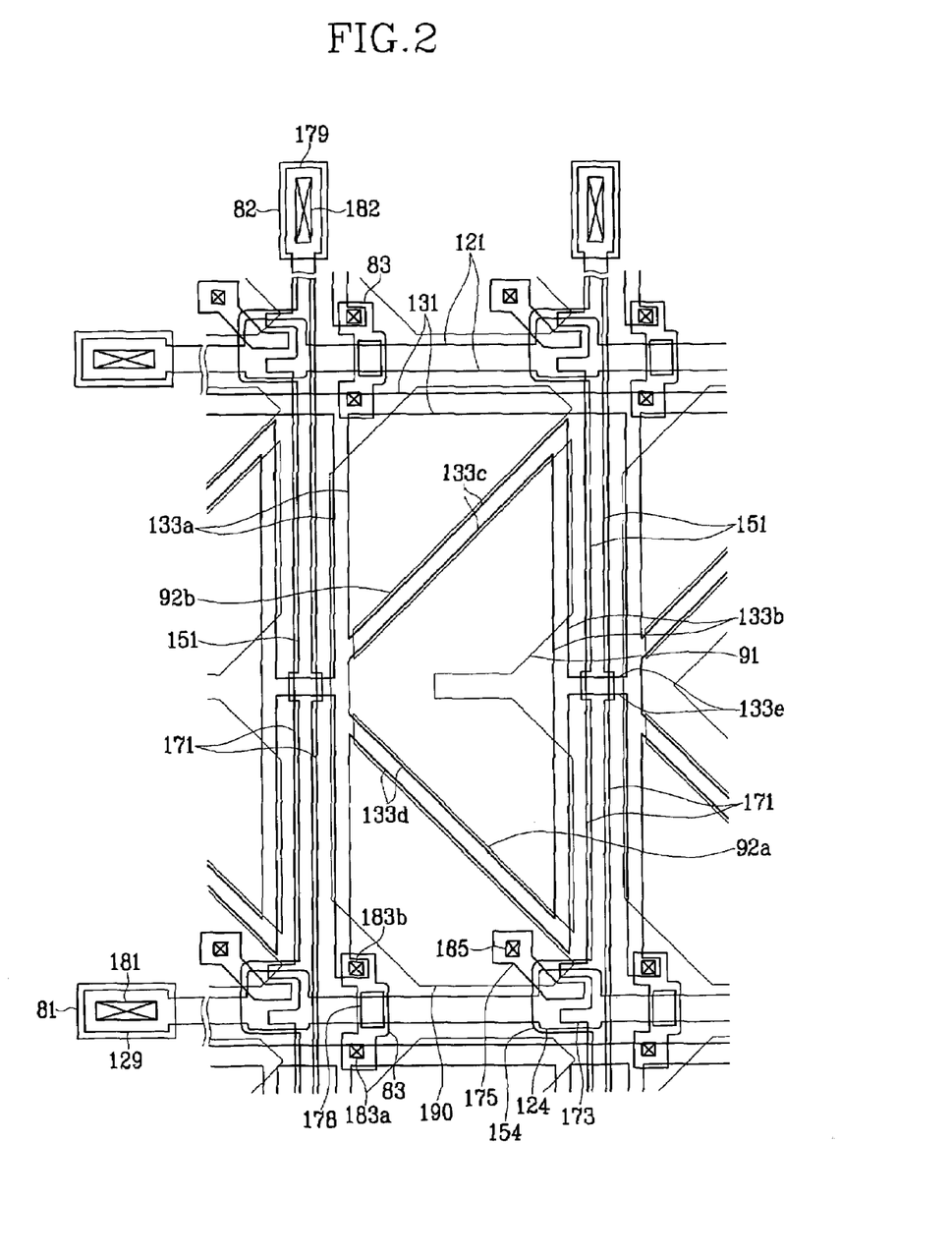
FIG. 2 shows a layout view of a TFT array panel for the LCD of FIG. 1.
Figure 3:
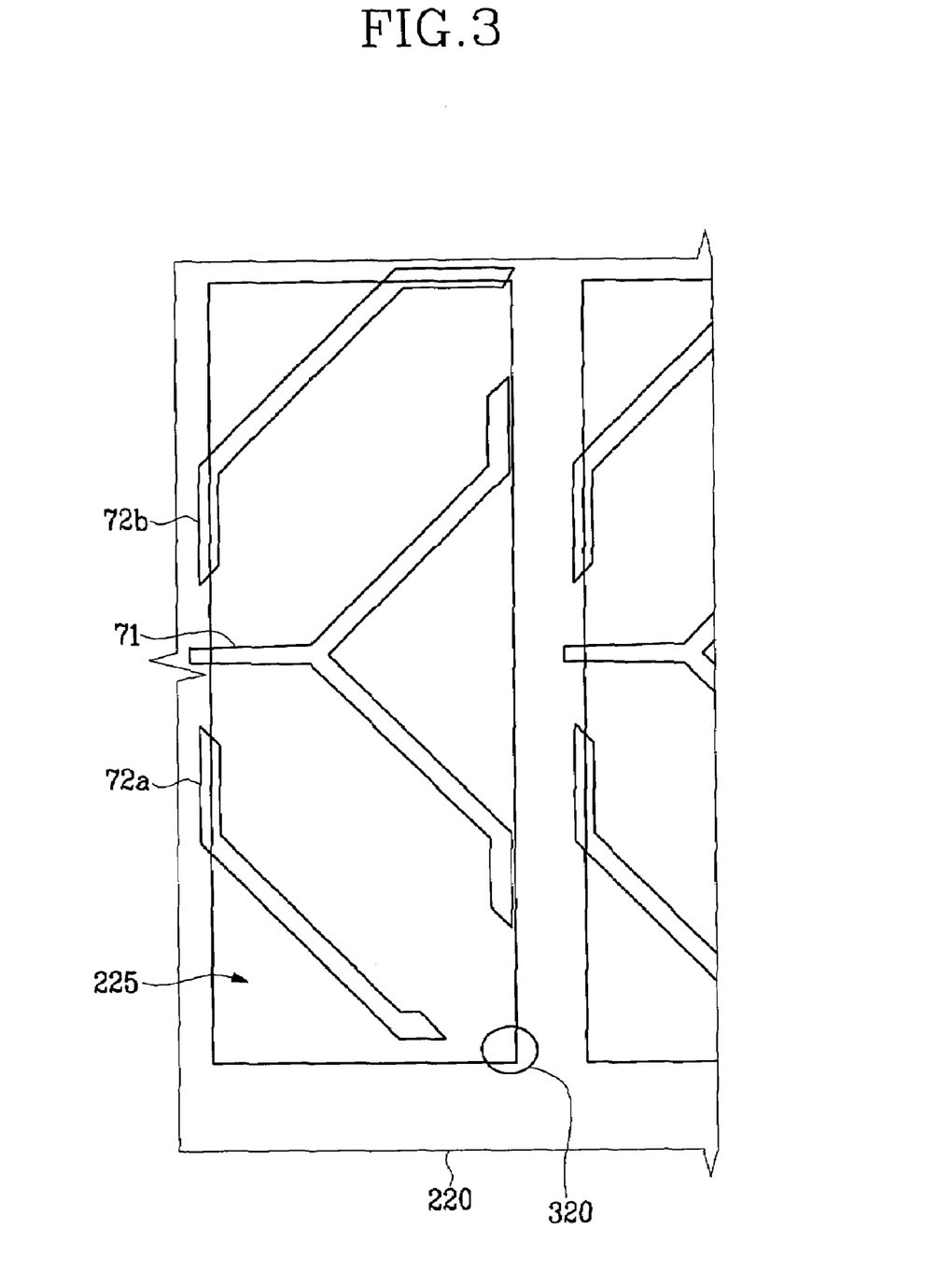
FIG. 3 shows a layout view of a common electrode panel for the LCD of FIG. 1.
Figure 4:
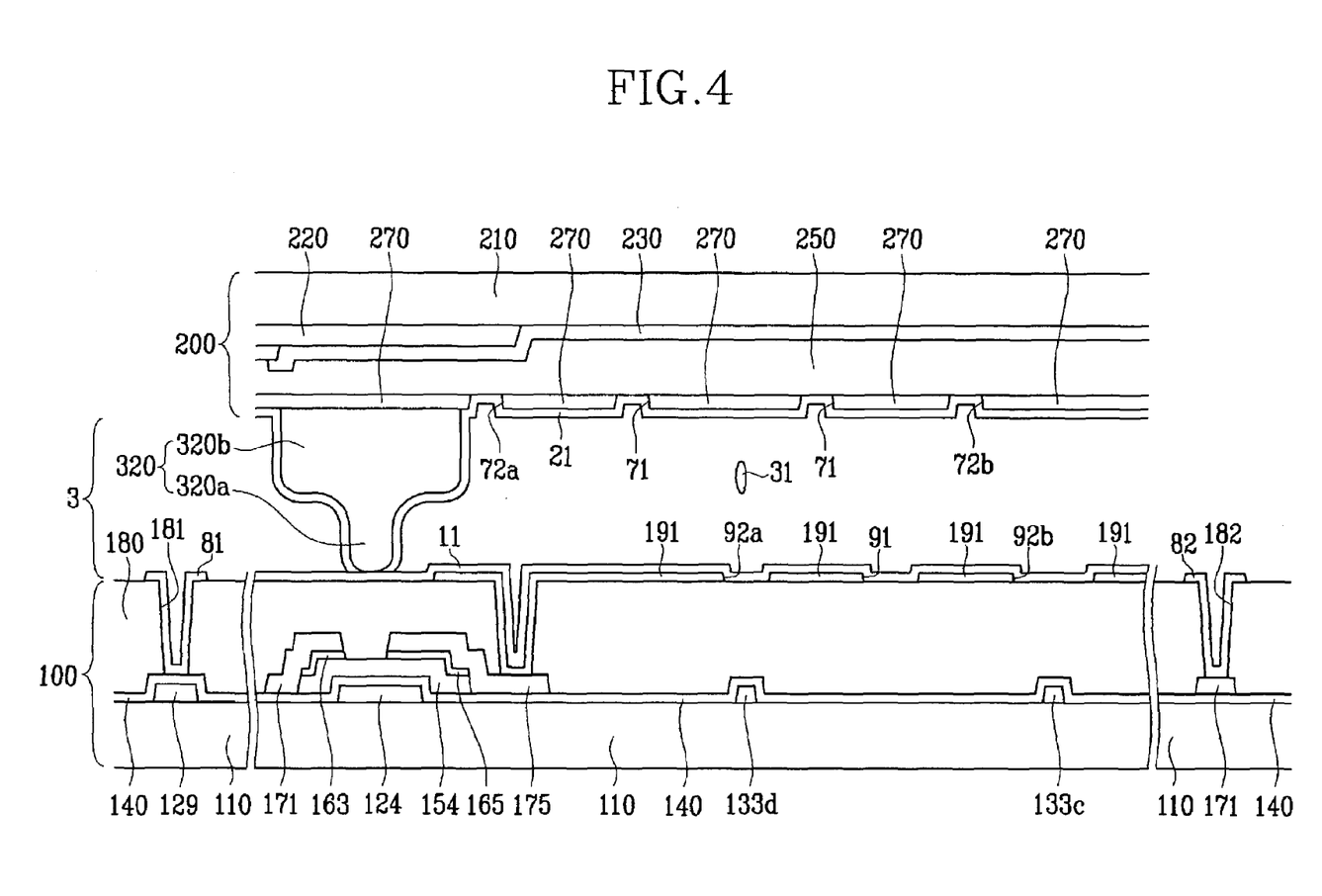
FIG. 4 shows a sectional view of the LCD of FIG. 1 taken along the line IV-IV'-IV''-IV'''.

FIG. 1 shows a layout view of an LCD according to an embodiment of the present invention, FIG. 2 shows a layout view of a TFT array panel for the LCD of FIG. 1, FIG. 3 shows a layout view of a common electrode panel for the LCD of FIG. 1, and FIG. 4 shows a sectional view of the LCD of FIG. 1 taken along the line IV-IV'-IV''-IV''';

An LCD according to an embodiment of the present invention includes a TFT array panel 100, a common electrode panel 200, and a LC layer 3 interposed between the TFT array and common electrode panels 100 and 200.

The TFT array panel 100 will now be described in detail with reference to FIGS. 1, 2, and 4.

A plurality of gate lines 121 and a plurality of storage electrode lines 131 are formed on an insulating substrate 110 made of a material such as transparent glass.

The gate lines 121 extend substantially in a transverse direction and are separated from each other, and transmit gate signals. Each gate line 121 includes a plurality of projections forming a plurality of gate electrodes 124 and an end portion 129 having a large area for contact with another layer (not shown) or an external driving circuit (not shown). A gate driving circuit (not shown) for generating the gate signals may be mounted on a flexible printed circuit (FPC) film (not shown), which may be attached to the substrate 110, directly mounted on the substrate 110, or integrated with the substrate 110. The gate lines 121 may extend to be connected to a driving circuit that may be integrated with the substrate 110.

Each of a plurality of storage electrode lines 131 extends substantially in the transverse direction and is disposed between two adjacent gate lines 121, and closer to an upper one of the two gate lines 121. Each storage electrode line 131 includes a plurality of sets of branches 133a to 133d and a plurality of connections 133e connecting the branches 133a to 133d.

A set of branches 133a to 133d includes two longitudinal branches forming first and second storage electrodes 133a and 133b that are spaced apart from each other, and two oblique branches forming third and fourth storage electrodes 133c and 133d that are connected between the first and second storage electrodes 133a and 133b. In detail, the first storage electrode 133a has a free end portion, and a fixed end portion that is connected to the storage electrode line 131 and has a projection. The third and fourth storage electrodes 133c and 133d extend approximately from a center of the first storage electrode 133a and upper and lower ends of the second storage electrode 133b, respectively. However, the storage electrode lines 131 may have various shapes and arrangements.

Each of the connections 133e is connected between a first storage electrode 133a of a set of storage electrodes 133a-133d and a second storage electrode 133b of another set of storage electrodes 133a-133d adjacent thereto.

The storage electrode lines 131 are supplied with a predetermined voltage such as a common voltage, which is applied to a common electrode 270 on the common electrode panel 200 of the LCD. Each storage electrode line 131 may include a pair of stems extending in the transverse direction.

The gate lines 121 and the storage electrode lines 131 are preferably made of an Al-containing metal such as Al and an Al alloy, a Ag-containing metal such as Ag and a Ag alloy, a Cu-containing metal such as Cu and a Cu alloy, a Mo-containing metal such as Mo and a Mo alloy, Cr, Ti, or Ta. The gate lines 121 and the storage electrode lines 131 may have a multi-layered structure including two films having different physical characteristics. One of the two films is preferably made of a low resistivity metal including an Al-containing metal, a Ag-containing metal, and a Cu-containing metal for reducing signal delay or voltage drop in the gate lines 121 and the storage electrode lines 131. The other film is preferably made of a material such as a Mo-containing metal, Cr, Ta, or Ti, which has good physical, chemical, and electrical contact characteristics with other materials such as indium tin oxide (ITO) or indium zinc oxide (IZO). Good examples of the combination of the two films are a lower Cr film and an upper Al alloy film and a lower Al film and an upper Mo film. However, the gate lines 121 and the storage electrode lines 131 may be made of various metals or conductors.

In addition, the lateral sides of the gate lines 121 and the storage electrode lines 131 are inclined relative to a surface of the substrate, and the inclination angle thereof ranges about 30 to about 80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated to "a-Si") or polysilicon are formed on the gate insulating layer 140. Each semiconductor stripe 151 extends substantially in the longitudinal direction and has a plurality of projections 154 branched out toward the gate electrodes 124. The semiconductor stripes 151 become wide near the gate lines 121 and the storage electrode lines 131 such that the semiconductor stripes 151 cover large areas of the gate lines 121 and the storage electrode lines 131.

A plurality of ohmic contact stripes and islands 163 and 165 preferably made of silicide or n+ hydrogenated a-Si heavily doped with an n-type impurity such as phosphorous are formed on the semiconductor stripes 151. Each ohmic contact stripe has a plurality of projections 163, and the projections 163 and the ohmic contact islands 165 are located in pairs on the projections 154 of the semiconductor stripes 151.

The lateral sides of the semiconductor stripes 151 and the ohmic contacts 163 and the ohmic contact islands 165 are inclined relative to a surface of the substrate, and the inclination angles thereof range about 30 to about 80 degrees.

A plurality of data lines 171, a plurality of drain electrodes 175 separated from the data lines 171, and a plurality of isolated metal pieces 178 are formed on the ohmic contacts 163 and 165 and the gate insulating layer 140.

The data lines 171 for transmitting data voltages extend substantially in the longitudinal direction and cross the gate lines 121 at right angles. The data lines 171 also intersect the storage electrode lines 131 and the connections 133e such that each data line 171 is disposed between the first and second storage electrodes 133a and 133b in adjacent sets of the branches 133a to 133d of the storage electrode lines 131. Each data line 171 includes an end portion 179 having a large area for contact with another layer or an external device. A data driving circuit (not shown) for generating the data signals may be mounted on an FPC film (not shown), which may be attached to the substrate 110, directly mounted on the substrate 110, or integrated with the substrate 110. The data lines 171 may extend to be connected to a driving circuit that may be integrated with the substrate 110. Each data line 171 includes a plurality of source electrodes 173 projecting toward the drain electrodes 175.

Each drain electrode 175 includes an end portion having a large area for contact with another layer and another end portion disposed on a gate electrode 124 and partly enclosed by a source electrode 173.

A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The metal pieces 178 are disposed on the gate lines 121 near the end portions of the first storage electrodes 133a.

The data lines 171, the drain electrodes 175, and the metal pieces 178 are preferably made of a refractory metal such as Cr, Mo, Ti, Ta, or alloys thereof. However, they may also have a multilayered structure including a low-resistivity film (not shown) and a good-contact film (not shown). A good example of the combination is a lower Mo film, an intermediate Al film, and an upper Mo film, as well as the above-described combinations of a lower Cr film and an upper Al—Nd alloy film and a lower Al film and an upper Mo film. However, the data lines 171, the drain electrodes 175, and the metal pieces 178 may be made of various metals or conductors.

Like the gate lines 121 and the storage electrode lines 131, the data lines 171 and the drain electrodes 175 have tapered lateral sides, and the inclination angles thereof range about 30 to about 80 degrees.

The ohmic contacts 163 and the ohmic contact islands 165 are interposed only between the underlying semiconductor stripes 151 and the overlying data lines 171 and the overlying drain electrodes 175 thereon, and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines 121 and the storage electrode lines 131 as described above, to smooth the profile of the surface, thereby preventing the disconnection of the data lines 171. The semiconductor stripes 151 include some exposed portions, which are not covered with the data conductors 171 and 175, such as portions located between the source electrodes 173 and the drain electrodes 175.

A passivation layer 180 is formed on the data lines 171, the drain electrodes 175, the metal pieces 178, and the exposed portions of the semiconductor stripes 151. The passivation layer 180 is preferably made of an inorganic insulator such as silicon nitride or silicon oxide, a photosensitive organic material having good flatness characteristics, or a low dielectric insulating material having a dielectric constant lower than about 4.0 such as a-Si:C:O and a-Si:O:F formed by plasma enhanced chemical vapor deposition (PECVD). The passivation layer 180 may include a lower film of an inorganic insulator and an upper film of an organic insulator such that it takes the excellent insulating characteristics of the organic insulator while protecting the exposed portions of the semiconductor stripes 151 from being damaged by the organic insulator.

The passivation layer 180 has a plurality of contact holes 182 and 185 exposing the end portions 179 of the data lines 171 and the end portions of the drain electrodes 175, respectively. The passivation layer 180 and the gate insulating layer 140 have a plurality of contact holes 181 exposing the end portions 129 of the gate lines 171, a plurality of contact holes 183a exposing portions of the storage electrode lines 131 near the fixed end portions of the first storage electrodes 133a, and a plurality of contact holes 183b exposing the projections of the free end portions of the first storage electrodes 133a.

A plurality of pixel electrodes 191, a plurality of contact assistants 81 and 82, and a plurality of overpasses 83, which are preferably made of a transparent conductor such as ITO or IZO or a reflective conductor such as Ag or Al, are formed on the passivation layer 180.

The pixel electrodes 191 are physically and electrically connected to the drain electrodes 175 through the contact holes 185 such that the pixel electrodes 191 receive the data voltages from the drain electrodes 175.

The pixel electrodes 191 supplied with the data voltages generate electric fields in cooperation with the common electrode 270, which determines orientations of liquid crystal molecules 31 in the liquid crystal layer 3.

A pixel electrode 191 and the common electrode 270 of the common electrode panel 200 form a liquid crystal capacitor, which stores applied voltages after deactivation of the TFT. An additional capacitor called a "storage capacitor," which is connected in parallel to the liquid crystal capacitor, is provided for enhancing the voltage storing capacity. The storage capacitors are implemented by overlapping the pixel electrodes 191 with the storage electrode lines 131 including the storage electrodes 133a to 133d.

Each pixel electrode 191 is chamfered at its left corners, and the chamfered edges of the pixel electrode 191 make an angle of about 45 degrees with the gate lines 121.

Each pixel electrode 191 has a lower cutout 92a, a center cutout 91, and an upper cutout 92b, which partition the pixel electrode 191 into a plurality of areas. The cutouts 91-92b substantially have inversion symmetry with respect to an imaginary transverse line bisecting the pixel electrode 191.

The lower and upper cutouts 92a and 92b obliquely extend from a right edge of the pixel electrode 191 near an upper right corner approximately to a center of a left edge of the pixel electrode 191, and overlap the third and fourth storage electrodes 133c and 133d. The lower and upper cutouts 92a and 92b are disposed at lower and upper halves of the pixel electrode 191, respectively, which can be divided by the imaginary transverse line. The lower and upper cutouts 92a and 92b make an angle of about 45 degrees with the gate lines 121, and extend substantially perpendicularly to each other.

The center cutout 91 extends along the imaginary transverse line and has an inlet from the right edge of the pixel electrode 191, which has a pair of inclined edges substantially parallel to the lower cutout 92a and the upper cutout 92b, respectively.

Accordingly, the lower half of the pixel electrode 191 is partitioned into two lower partitions by the lower cutout 92a and the upper half of the pixel electrode 191 is partitioned into two upper partitions by the upper cutout 92b. The number of partitions or the number of the cutouts is varied depending on design factors such as the size of the pixels, the ratio of the transverse edges and the longitudinal edges of the pixel electrodes, and the type and characteristics of the liquid crystal layer 3.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and complement the adhesion of the end portions 129 and 179 and external devices.

The overpasses 83 cross over the gate lines 121 and are connected to the exposed projection of the fixed end portions of the first storage electrodes 133a and the exposed portions of the storage electrode lines 131 through the contact holes 183b and 183a, respectively, which are disposed opposite each other with respect to the gate lines 121. The overpasses 83 overlap the metal pieces 178, and may be electrically connected to the metal pieces 178. The storage electrode lines 131 including the storage electrodes 133a to 133d along with the overpasses 83 and the metal pieces 178 may be used for repairing defects in the gate lines 121, the data lines 171, or the TFTs.

A description of the common electrode panel 200 follows with reference to FIGS. 1, 3, and 4.

A light-blocking member 220 called a black matrix for preventing light leakage is formed on an insulating substrate 210 made of a material such as transparent glass. The light-blocking member 220 may include a plurality of openings 225 that face the pixel electrodes 191, and may have substantially the same planar shape as the pixel electrodes 191. Otherwise, the light-blocking member 220 may include linear portions corresponding to the data lines 171 and the gate lines 121, and other portions corresponding to the TFTs.

A plurality of color filters 230 are formed on the substrate 210, and are disposed substantially in the areas enclosed by the light blocking member 220. The color filters 230 may extend substantially in the longitudinal direction along the pixel electrodes 191. The color filters 230 may represent one of the primary colors such as red, green, or blue colors.

An overcoat 250 for preventing the color filters 230 from being exposed and for providing a flat surface is formed on the color filters 230 and the light-blocking member 220. The overcoat 250 may be omitted.

A common electrode 270 preferably made of transparent conductive material such as ITO and IZO is formed on the overcoat 250.

The common electrode 270 has a plurality of sets of cutouts 71-72b.

A set of cutouts 71-72b faces a pixel electrode 191, and includes a lower cutout 72a, a center cutout 71, and an upper cutout 72b. Each of the cutouts 71-72b is disposed between adjacent cutouts 91-92b of the pixel electrode 191 or between a cutout 92a or 92b and a chamfered edge of the pixel electrode 191. In addition, each of the cutouts 71-72b has at least an oblique portion extending parallel to the lower cutout 92a or the upper cutout 92b of the pixel electrode 191, and the distances between an adjacent two of the cutouts 71-72b and 91-92b, the oblique portions thereof, the oblique edges thereof, and the chamfered edges of the pixel electrode 191, which are parallel to each other, are substantially the same. The cutouts 71-72b substantially have inversion symmetry with respect to the above-described transverse line bisecting the pixel electrode 191.

Each of the lower and upper cutouts 72a and 72b includes an oblique portion extending approximately from a left edge of the pixel electrode 191 approximately to a lower or upper edge of the pixel electrode 191, and transverse and longitudinal portions extending from respective ends of the oblique portion along edges of the pixel electrode 191, overlapping the edges of the pixel electrode 191, and making obtuse angles with the oblique portion.

The center cutout 71 includes a central transverse portion extending approximately from the left edge of the pixel electrode 191 along the third storage electrode 133c, a pair of oblique portions extending from an end of the central transverse portion approximately to a right edge of the pixel electrode and making obtuse angles with the central transverse portion, and a pair of terminal longitudinal portions extending from the ends of the respective oblique portions along the right edge of the pixel electrode 191, overlapping the right edge of the pixel electrode 191, and making obtuse angles with the respective oblique portions.

The number of the cutouts 71-72b may be varied depending on design factors, and the light-blocking member 220 may also overlap the cutouts 71-72b to block the light leakage through the cutouts 71-72b.

A plurality of columnar spacers 320 preferably made of insulator material is formed between the TFT array panel 100 and the common electrode panel 200. The spacers 320 may contact the passivation layer 180 of the TFT array panel 100 and the common electrode 270 of the common electrode panel 200 such that they support a gap between the TFT array and common electrode panels 100 and 200.

The column spacers 320 include a pillar 320a and a base 320b supporting the pillar 320a.

Figure 5A:
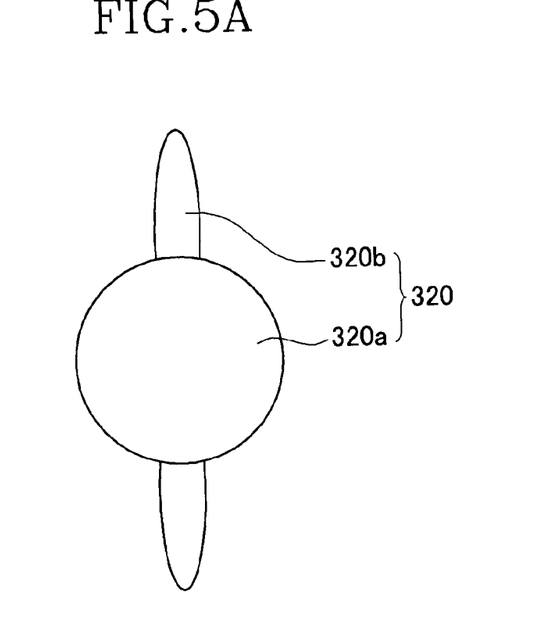
FIGS. 5A to 5F show plane views illustrating the column spacers according to an embodiment of the present invention.
Figure 5B:
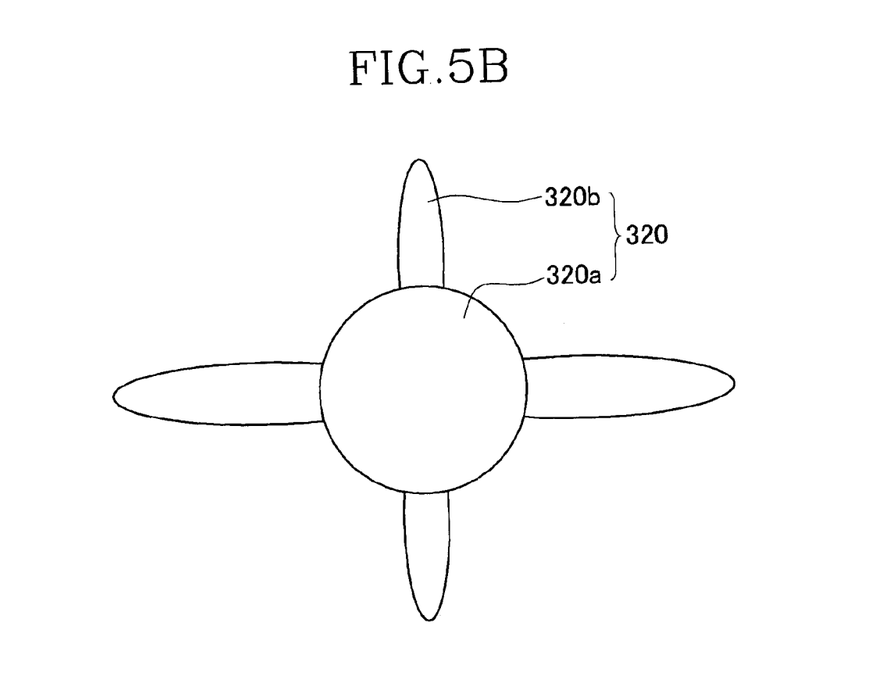
Figure 5C:
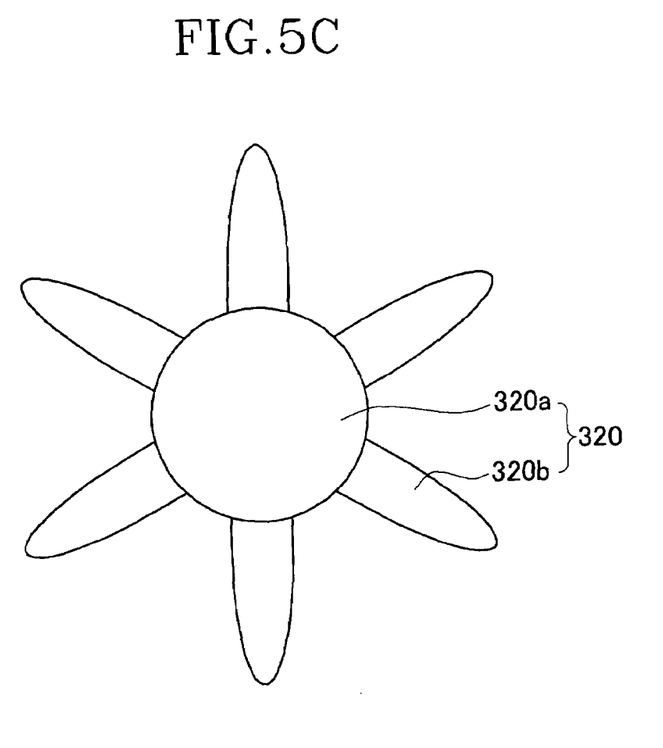
Figure 5D:
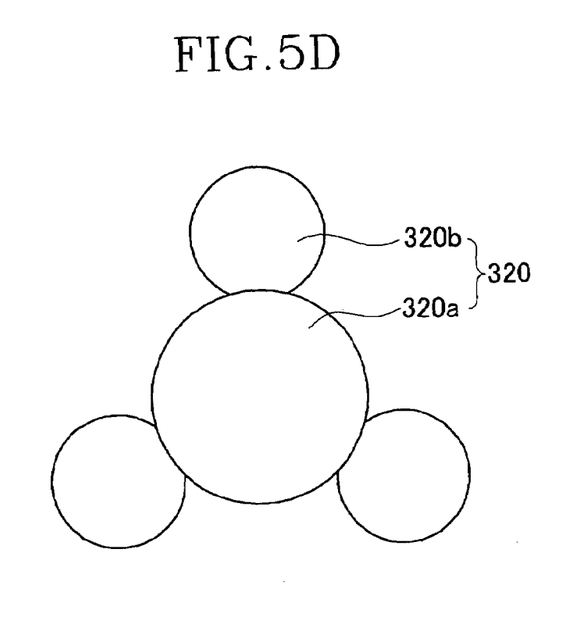
Figure 5E:
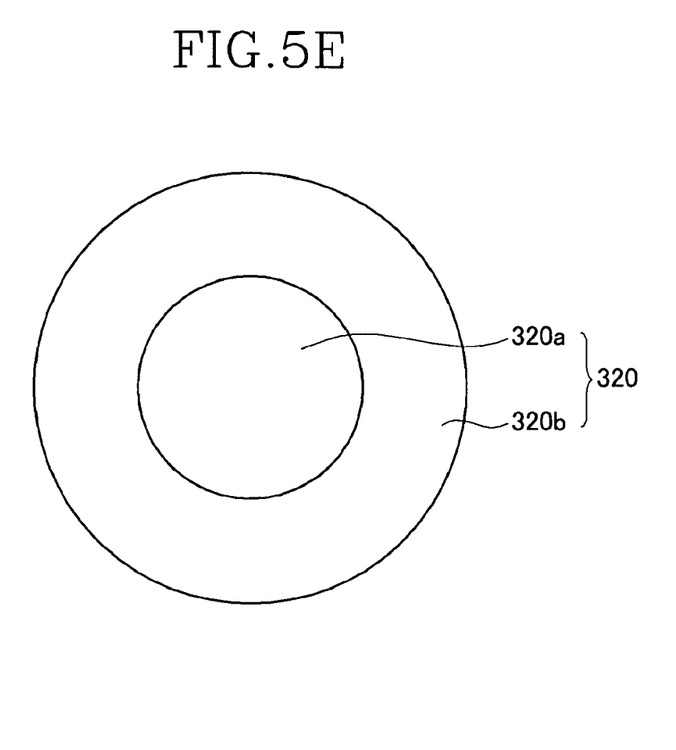
Figure 5F:
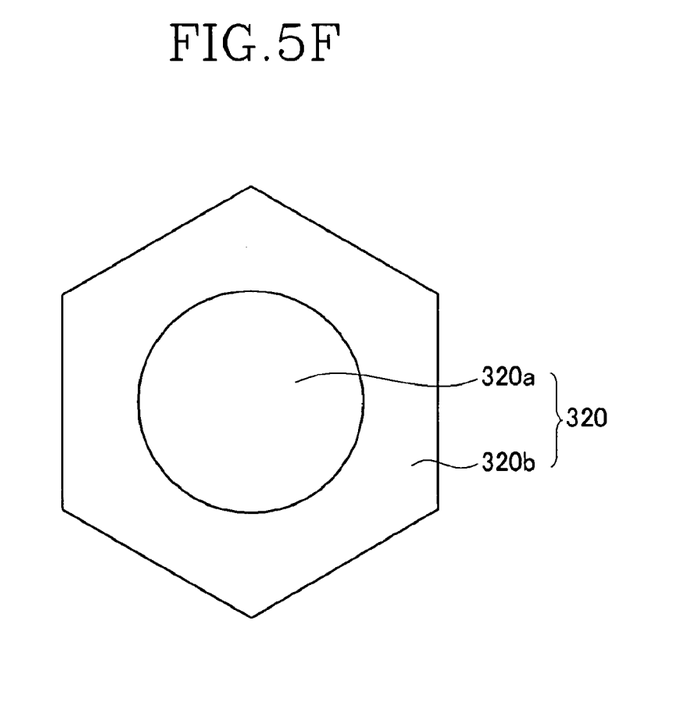

FIGS. 5A to 5F show plane views illustrating the column spacers according to an embodiment of the present invention. The planar shape of the base 320b has a plurality of branches, which are extended with a radial shape with respect to the center of the pillar 320a. For example, the base 320b may be extended in the upper and the lower directions with a line shape as shown in FIG. 5A, the base 320b may be extended in the upper, the lower, the left, and the right directions with a cross shape as shown in FIG. 5B, the base 320b may be extended in various directions with a radial shape as shown in FIGS. 5C and 5D, and the base 320b may enclose the pillar 320 with a circular or polygonal shape as shown in FIGS. 5E and 5F. In FIGS. 5A to 5F, it is preferable that the base 320b has a symmetric structure with respect to the horizontal or vertical line.

The pillar 320a and the base 320b are simultaneously formed. The height of the base 320b is in the range of about 50 to about 80 percent of that of the column spacer 320. However, it is preferable that the height of the base 320b is in the range of about 30 to about 60 percent of that of the column spacers 320 before compression of the lower and the upper, TFT array and common electrode panels 100 and 200. The heights of the column spacer 320 and the base 320b have a margin of about 10 percent according to the process margin or the various positions disposed on the TFT array and common electrode panels 100 and 200, since the height of the column spacers 320 is reduced by about 20 percent upon compression of the lower and upper, TFT array and common electrode panels 100 and 200.

The position-dependent height of the column spacer is obtained by several techniques, for example, by providing translucent areas on the exposure mask as well as transparent areas and light blocking opaque areas. The translucent areas may have a slit pattern, a lattice pattern, or may have a thin film(s) with intermediate transmittance or intermediate thickness. When using a slit pattern, it is preferable that the width of the slits or the distance between the slits be smaller than the resolution of a light exposer used for the photolithography. Another example is to use reflowable photoresist. Once a photoresist pattern made of a reflowable material is formed by using a normal exposure mask with only transparent areas and opaque areas, it is subject to a reflow process to flow onto areas without the photoresist, thereby forming thin portions.

Figure 10:
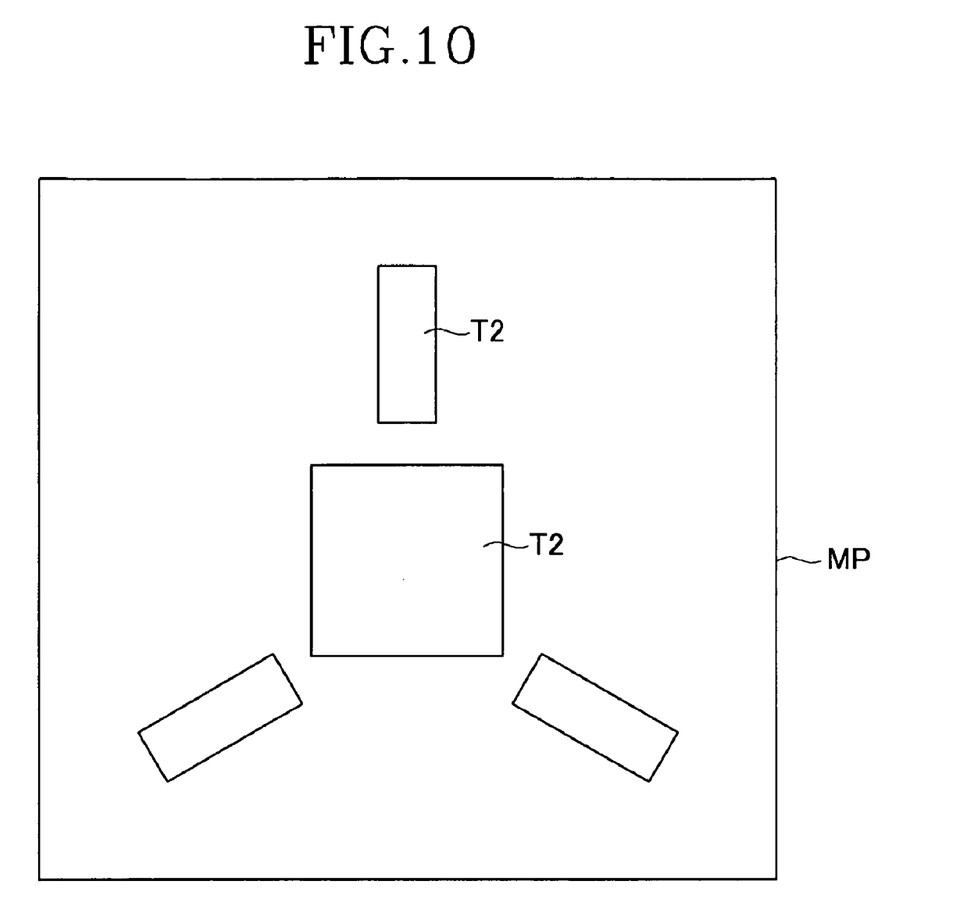
FIG. 10 shows a layout illustrating a photo mask according to an embodiment of the present invention.

FIG. 10 shows a layout illustrating a photo mask according to an embodiment of the present invention. A photo mask MP as shown in FIG. 10 may be used to form the column spacer 320 as shown in FIG. 5D. The photo mask MP of FIG. 10 has a first transparent area T1 corresponding to the pillar and a second transparent area T2 corresponding the branches, and the size of the second transparent area T2 is larger than that of the first transparent area T1 to make the different heights of the pillar 320a and the branches 320b through exposure to different amounts of light. To form the column spacer 320, the photo mask MP having the first and the second transparent areas T1 and T2 is used as shown in FIG. 10, but the process of using a reflowable material may be used.

As described above, when the column spacers 320 are formed and the liquid crystal display is externally impacted, the pillar 320a of the column spacers 320 first absorbs a portion of the external impact, then the rest of the external impact is dispersed through the base 320b. Accordingly, collapse of the underlayers of the column spacers 320 may be avoided.

Alignment layers 11 and 21 that may be homeotropic are coated on inner surfaces of the TFT array and common electrode panels 100 and 200. Polarizers (not shown) are provided on outer surfaces of the TFT array and common electrode panels 100 and 200 such that their polarization axes may be crossed and one of the transmissive axes may be parallel to the gate lines 121. One of the polarizers may be omitted when the LCD is a reflective LCD.

The LCD may further include at least one retardation film (not shown) for compensating the retardation of the LC layer 3. The retardation film has birefringence and imparts retardation opposite to that given by the LC layer 3. The retardation film may include a uniaxial or biaxial optical compensation film, and in particular, a negative uniaxial compensation film.

The LCD may further include a backlight unit (not shown) for supplying light to the LC layer 3 through the polarizers, the retardation film, and the TFT array and common electrode panels 100 and 200.

It is preferable that the LC layer 3 has negative dielectric anisotropy and that it be subjected to vertical alignment in which the LC molecules in the LC layer 3 are aligned such that their long axes are substantially vertical to the surfaces of the TFT array and common electrode panels 100 and 200 in the absence of an electric field. Accordingly, incident light cannot pass the crossed polarization system 12 and 22.

Upon application of the common voltage to the common electrode 270 and a data voltage to the pixel electrodes 191, an electric field substantially perpendicular to the surfaces of the TFT array and common electrode panels 100 and 200 is generated. The LC molecules tend to change their orientations in response to the electric field such that their long axes become perpendicular to the field direction. The common electrode 270 and the pixel electrodes 191 are used as a field-generating electrode.

The cutouts 91 to 92b and 71 to 72b of the electrodes 191 and 270 and the edges of the pixel electrodes 191 distort the electric field to have a horizontal component that is substantially perpendicular to the edges of the cutouts 91 to 92b and 71 to 72b and the edges of the pixel electrodes 191. Accordingly, the LC molecules on each sub-area are tilted in a direction by the horizontal component, and the azimuthal distribution of the tilt directions are localized to four directions, thereby increasing the viewing angle of the LCD.

At least one of the cutouts 91 to 92b and 71 to 72b can be substituted with protrusions (not shown) or depressions (not shown). The protrusions are preferably made of an organic or inorganic material and disposed on or under the field-generating electrodes 191 or 270.

The shapes and the arrangements of the cutouts 91 to 92b and 71 to 72b may be modified.

An LCD according to an embodiment of the present invention will be described in detail with reference to FIGS. 6 and 7.

Figure 6:
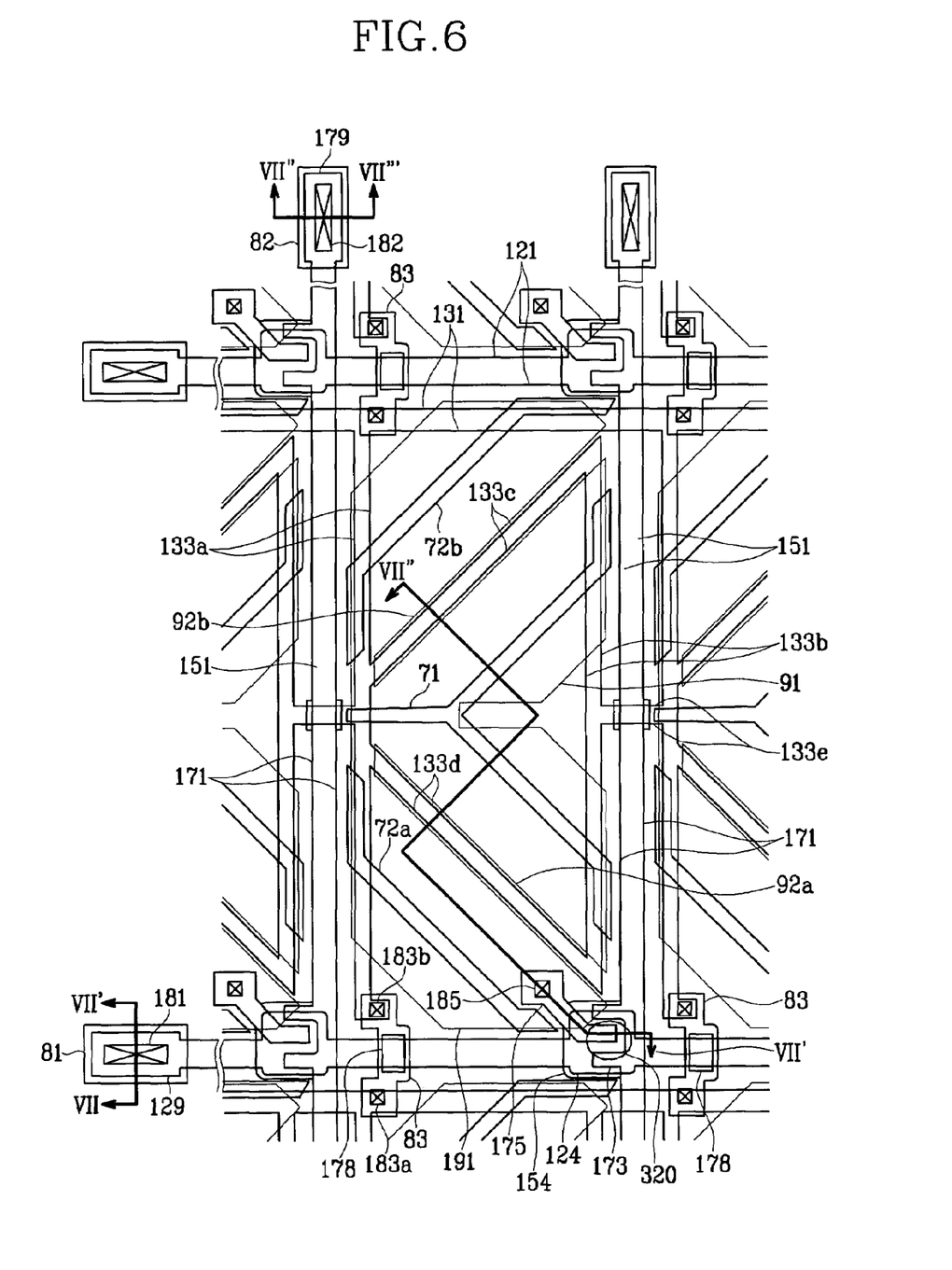
FIG. 6 shows a layout view of an LCD according to an embodiment of the present invention.
Figure 7:
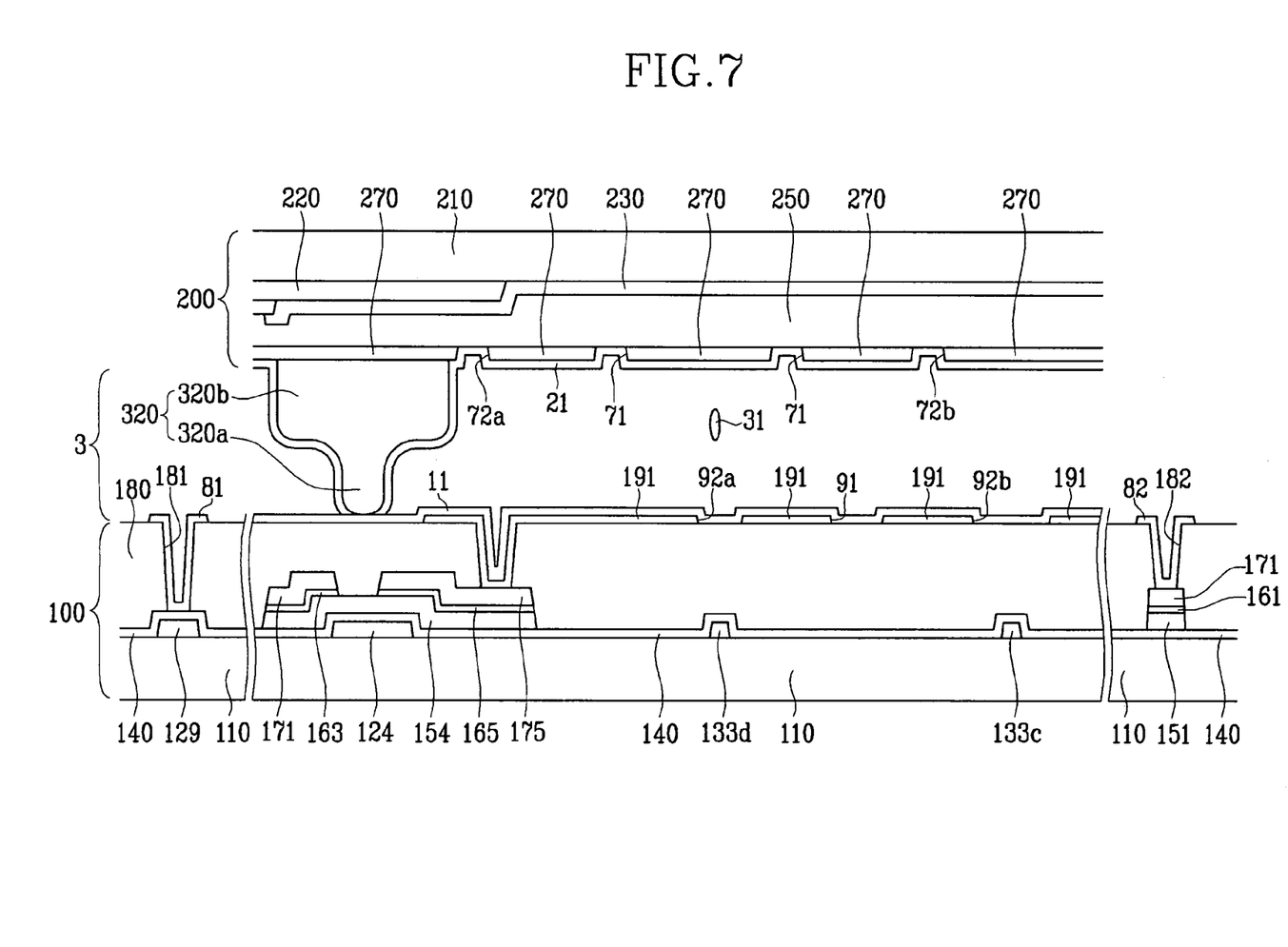
FIG. 7 shows a sectional view of the LCD of FIG. 6 taken along the line VII-VII'-VII''-VII'''.

FIG. 6 shows a layout view of an LCD according to an embodiment of the present invention, and FIG. 7 shows a sectional view of the LCD of FIG. 6 taken along the line VII-VII'-VII"-VII'".

Referring to FIGS. 6 and 7, an LCD according to this embodiment also includes a TFT array panel 100, a common electrode panel 200, and an LC layer 3 between the TFT array and common electrode panels 100 and 200.

Layered structures of the TFT array and common electrode panels 100 and 200 are similar to those of FIGS. 1-4.

Regarding the TFT array panel 100, a plurality of gate lines 121 including gate electrodes 124 and end portions 129 and a plurality of storage electrode lines 131 including a plurality of sets of branches 133a to 133d and a plurality of connections 133e are formed on a substrate 110, and a gate insulating layer 140, a plurality of semiconductor stripes 151 including projections 154, and a plurality of ohmic contact stripes including projections 163 and a plurality of ohmic contact islands 165 are sequentially formed thereon. A plurality of data lines 171 including source electrodes 173 and end portions 179, a plurality of drain electrodes 175, and a plurality of isolated metal pieces 178 are formed on the ohmic contacts 163 and 165, and a passivation layer 180 is formed thereon. A plurality of contact holes 181, 182, 183a, 183b, and 185 are provided at the passivation layer 180 and the gate insulating layer 140. A plurality of pixel electrodes 191 having a plurality of cutouts 91-92b, a plurality of contact assistants 81 and 82, and a plurality of overpasses 83 are formed on the passivation layer 180, and an alignment layer 11 is coated thereon.

Regarding the common electrode panel 200, a light blocking member 220 having a plurality of openings 225, a plurality of color filters 230, an overcoat 250, a common electrode 270 having a plurality of cutouts 71-72b, a plurality of column spacers 320, and an alignment layer 21 are formed on an insulating substrate 210.

The semiconductor stripes 151 of the TFT array panel 100 have similar planar shapes as the data lines 171 and the drain electrodes 175 of FIGS. 1-4, as well as the underlying ohmic contacts 163 and 165. However, the projections 154 of the semiconductor stripes 151 include some exposed portions, which are not covered with the data lines 171 and the drain electrodes 175, such as portions located between the source electrodes 173 and the drain electrodes 175.

Furthermore, the TFT array panel 100 further includes a plurality of semiconductor islands (not shown) and a plurality of ohmic contact islands (not shown) disposed thereon, which are disposed on the metal pieces 178.

A manufacturing method of the TFT array panel simultaneously forms the data lines 171, the drain electrodes 175, the metal pieces 178, the semiconductors 151, and the ohmic contacts 163 and 165 using one photolithography process.

A photoresist pattern for the photolithography process has position-dependent thickness as the formation of the column spacers 320, and in particular, it has first and second portions with decreased thickness. The first portions are located on wire areas that will be occupied by the data lines 171, the drain electrodes 175, and the metal pieces 172, and the second portions are located on channel areas of TFTs.

As a result, the manufacturing process is simplified by omitting a photolithography step.

Many of the above-described features of the LCD shown in FIGS. 1-4 may be appropriate for the TFT array panel shown in FIGS. 6 and 7.

An LCD according to an embodiment of the present invention will be described in detail with reference to FIGS. 8 and 9.

Figure 8:
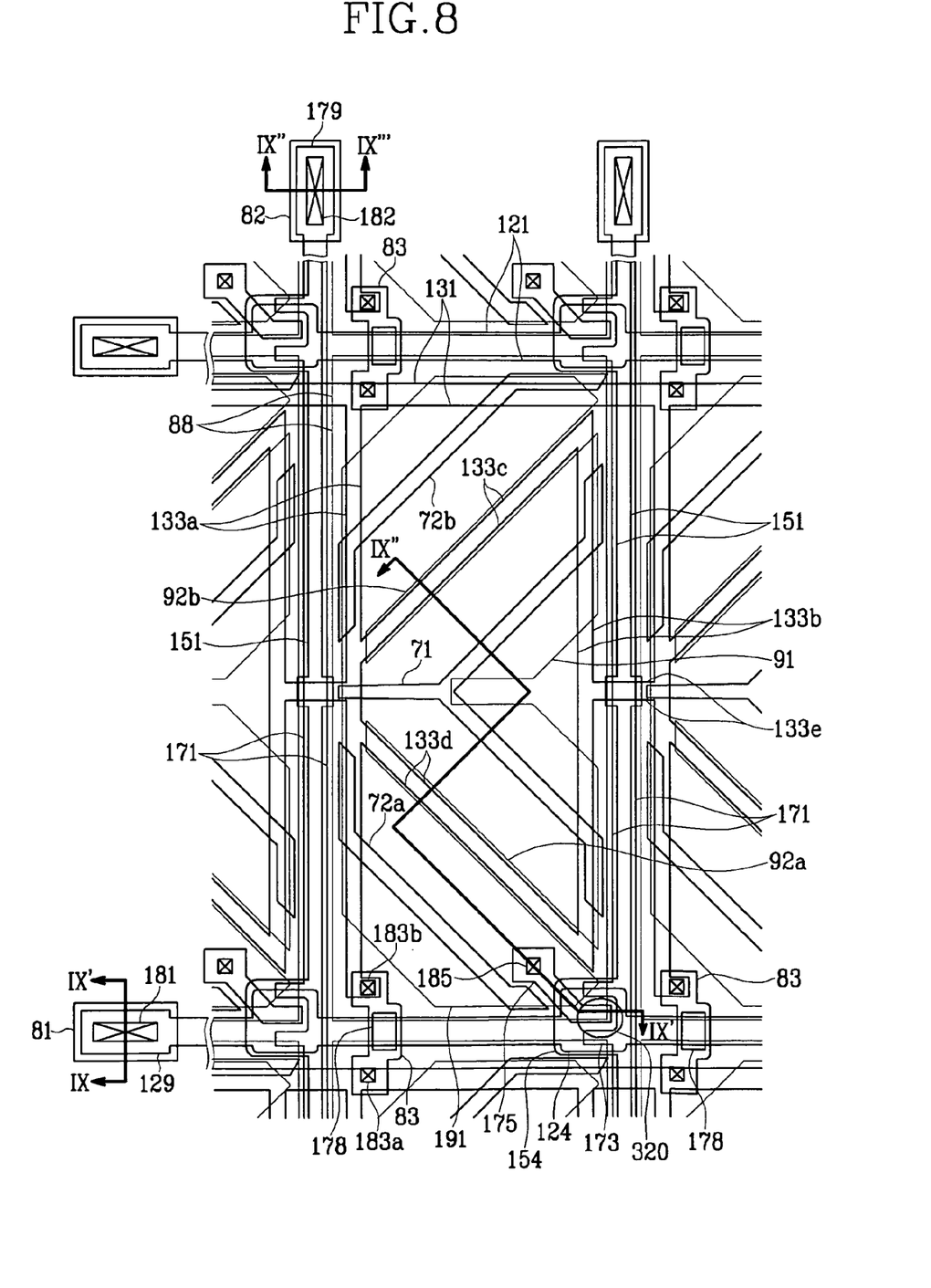
FIG. 8 shows a layout view of an LCD according to an embodiment of the present invention.
Figure 9:
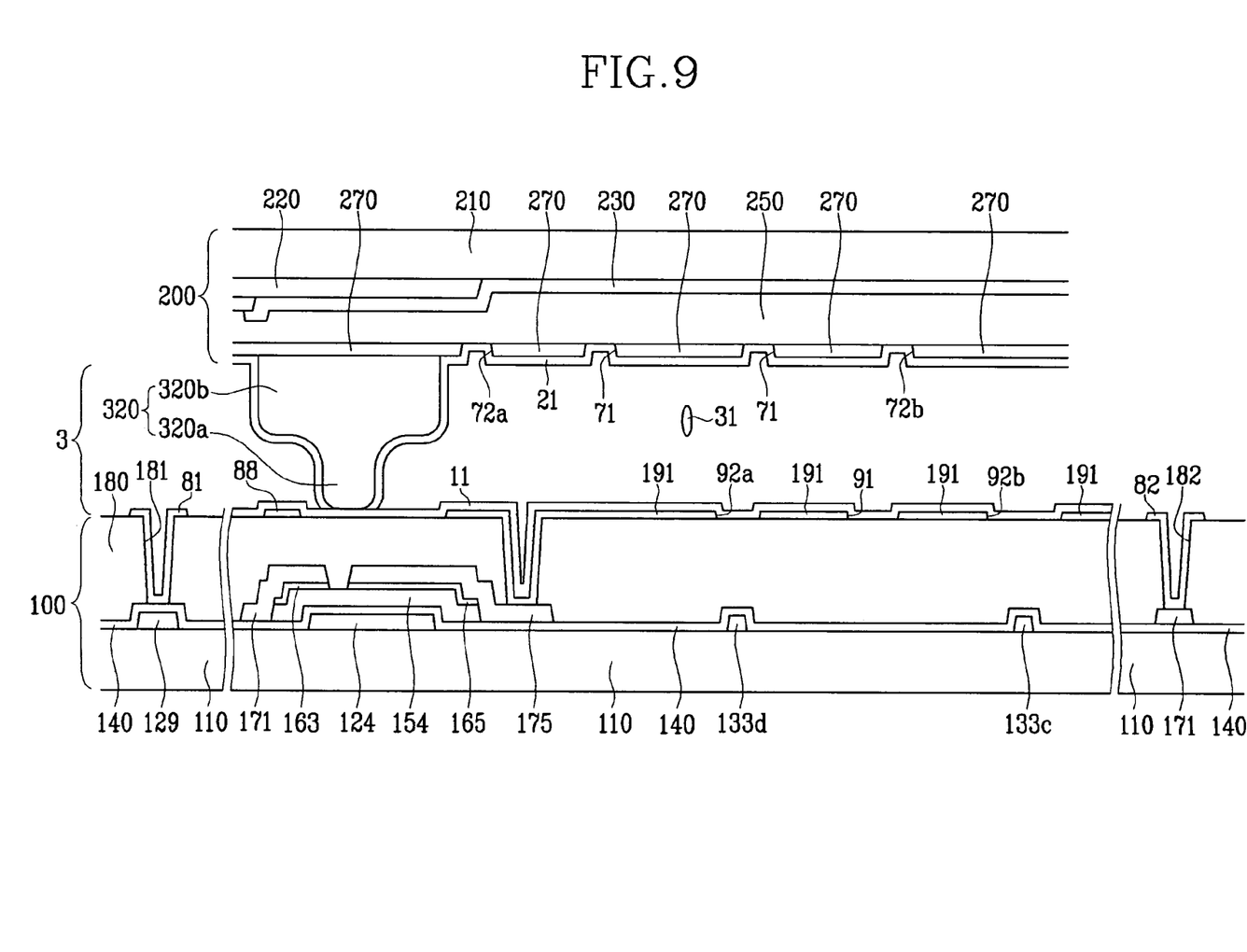
FIG. 9 shows a sectional view of the LCD of FIG. 8 taken along the line IX-IX'-IX''-IX'''.

FIG. 8 shows a layout view of an LCD according to an embodiment of the present invention, and FIG. 9 shows a sectional view of the LCD of FIG. 8 taken along the line IX-IX'-X"-X'".

Layered structures of the thin film transistor array panel are similar to those of FIGS. 1-4.

Regarding the TFT array panel 100, a plurality of gate lines 121 including gate electrodes 124 and end portions 129 and a plurality of storage electrode lines 131 including a plurality of sets of branches 133a to 133d and a plurality of connections 133e are formed on a substrate 110, and a gate insulating layer 140, a plurality of semiconductor stripes 151 including projections 154, and a plurality of ohmic contact stripes including projections 163 and a plurality of ohmic contact islands 165 are sequentially formed thereon. A plurality of data lines 171 including source electrodes 173 and end portions 179, a plurality of drain electrodes 175, and a plurality of isolated metal pieces 178 are formed on the ohmic contacts 163 and 165, and a passivation layer 180 is formed thereon. A plurality of contact holes 181, 182, 183a, 183b, and 185 are provided at the passivation layer 180 and the gate insulating layer 140. A plurality of pixel electrodes 191 having a plurality of cutouts 91-92b, a plurality of contact assistants 81 and 82, and a plurality of overpasses 83 are formed on the passivation layer 180, and an alignment layer 11 is coated thereon.

The thin film transistor array panel further includes a shielding electrode 88. The shielding electrode 88 is supplied with the common voltage and includes longitudinal portions extending along the data lines 171 and transverse portions extending along the gate lines 127 to connect adjacent longitudinal portions. The longitudinal portions fully cover the data lines 171, while each of the transverse portions lies within the boundary of a gate line 121.

The shielding electrode 88 blocks electromagnetic interference between the data lines 171 and the pixel electrodes 191 and between the data lines 171 and the common electrode 270 to reduce the distortion of the voltage of the pixel electrodes 191 and the signal delay of the data voltages carried by the data lines 171.

Many of the above-described features of the LCD shown in FIGS. 1-4 may be appropriate for the TFT array panel shown in FIGS. 8 and 9.

As described above, the column spacers have the pillar and the base with different widths and heights, and the protruding base portion. Accordingly, the liquid crystal display may absorb an external impact without a reduction of the elasticity intensity such that collapse of the underlayers may be avoided.

While the present invention has been described in detail with reference to the exemplary embodiments, those skilled in the art will appreciate that various modifications and substitutions can be made thereto without departing from the spirit and scope of the present invention as set forth in the appended claims.

What is claimed is:

1. A liquid crystal display panel, comprising:
   a first panel and a second panel facing each other;
   a liquid crystal layer formed between the first and second panels; and
   a plurality of column spacers each comprising a pillar and a base supporting the pillar, wherein the base comprises a plurality of branches which are extended with respect to the center of the pillar,
   wherein an end portion of each of the branches is isolated.

2. The liquid crystal display panel of claim 1, wherein the width of the pillar is less than that of the base.

3. The liquid crystal display panel of claim 2, wherein the branches are extended in upper and lower directions with a line shape.

4. The liquid crystal display panel of claim 2, wherein the branches are extended to upper, lower, left, and right directions with a cross shape.

5. The liquid crystal display panel of claim 1, wherein the plane of the base has symmetry with respect to a vertical or a horizontal line.

6. The liquid crystal display panel of claim 1, wherein the pillar and the base are made of a single body.

7. The liquid crystal display panel of claim 1, wherein the height of the base is in the range of about 50 to about 80 percent of that of the column spacers.

8. The liquid crystal display panel of claim 1, wherein the first panel includes:
   a plurality of gate lines and data lines intersecting each other;
   a plurality of thin film transistors connected to the gate lines and the data lines; and
   a plurality of pixel electrodes connected to the thin film transistors.

9. The liquid crystal display panel of claim 1, wherein the second panel includes: a plurality of color filters; and a common electrode formed on the color filters.

10. The liquid crystal display panel of claim 1, wherein the plurality of branches comprises two branches symmetrically arranged with respect to the center of the pillar.

11. The liquid crystal display panel of claim 1, wherein the plurality of branches comprises three branches symmetrically arranged with respect to the center of the pillar.

12. The liquid crystal display panel of claim 1, wherein the plurality of branches comprises four branches symmetrically arranged with respect to the center of the pillar.

13. The liquid crystal display panel of claim 1, wherein the plurality of branches comprises six branches symmetrically arranged with respect to the center of the pillar.

14. The liquid crystal display panel of claim 1, wherein the height of the base is less than that of the pillar.

15. A liquid crystal display panel comprising:
   a first panel and a second panel facing each other;
   a liquid crystal layer formed between the first and second panels; and
   a plurality of column spacers, each comprising: a pillar, and a base supporting the pillar, wherein the width of the pillar is less than that of the base portion, the base includes a plurality of branches that are centrally extended with a radial shape and the branches are extended in upper and lower directions with a line shape or the branches are extended to upper, lower, left, and right directions with a cross shape;
   wherein an end portion of each of the branches is isolated.

16. The liquid crystal display panel of claim 15, wherein the height of the base is less than that of the pillar.

* * * * *